United States Patent [19]

Spence et al.

[11] 4,283,726

[45] Aug. 11, 1981

[54] DUAL FREQUENCY DISTANCE MEASURING SYSTEM

[75] Inventors: Lewis C. Spence, P.O. 10116, Riviera Beach, Fla. 33404; Stephen Martin, Miami, Fla.

[73] Assignee: Lewis C. Spence, Riviera Beach, Fla.

[21] Appl. No.: 939,810

[22] Filed: Sep. 5, 1978

[51] Int. Cl.³ .............................................. G01S 5/06
[52] U.S. Cl. .............................................. 343/112 D
[58] Field of Search .................................. 343/112 D

[56] References Cited

U.S. PATENT DOCUMENTS

| | | | |
|---|---|---|---|
| 2,947,985 | 8/1960 | Cooley | 343/112 D X |
| 3,366,957 | 1/1968 | Lode | 343/112 D |
| 3,696,427 | 10/1972 | Nard | 343/112 D |
| 3,755,816 | 8/1973 | Kratzer | 343/112 D |

*Primary Examiner*—T. H. Tubbesing
*Attorney, Agent, or Firm*—Saidman & Sterne

[57] ABSTRACT

A radio frequency distance measuring system and method where two continuous wave carrier signals, derived from a stable frequency source, are radiated from a known reference point. The frequency of the first continuous wave carrier signal is displaced from the frequency of the second continuous wave carrier signal by a selected difference frequency. When received at the unknown point, the two continuous wave carrier signals are mixed to provide a difference or beat frequency marker signal, delayed in arrival at the unknown point from the known point by the speed of light. A locally generated marker signal is derived from a stable frequency source at the unknown point, and has the same frequency as the difference frequency signal. The leading or trailing edge of the difference frequency signal can be compared with the locally generated marker signal, and the time difference or phase difference between them can be displayed using a phase meter or time interval indicator and corresponds to determine directly the distance between the known transmitter reference point and the unknown receiver point. Multiple known reference point transmitters, each transmitting two continuous wave carrier signals displaced in frequency by a selected difference frequency, can be used to obtain two or more distance measurements at the unknown point to determine the position of the unknown receive point with respect to the known transmitter points. A chart shows the relationship of the selected difference frequency to the distance that can be measured without ambiguity.

44 Claims, 5 Drawing Figures

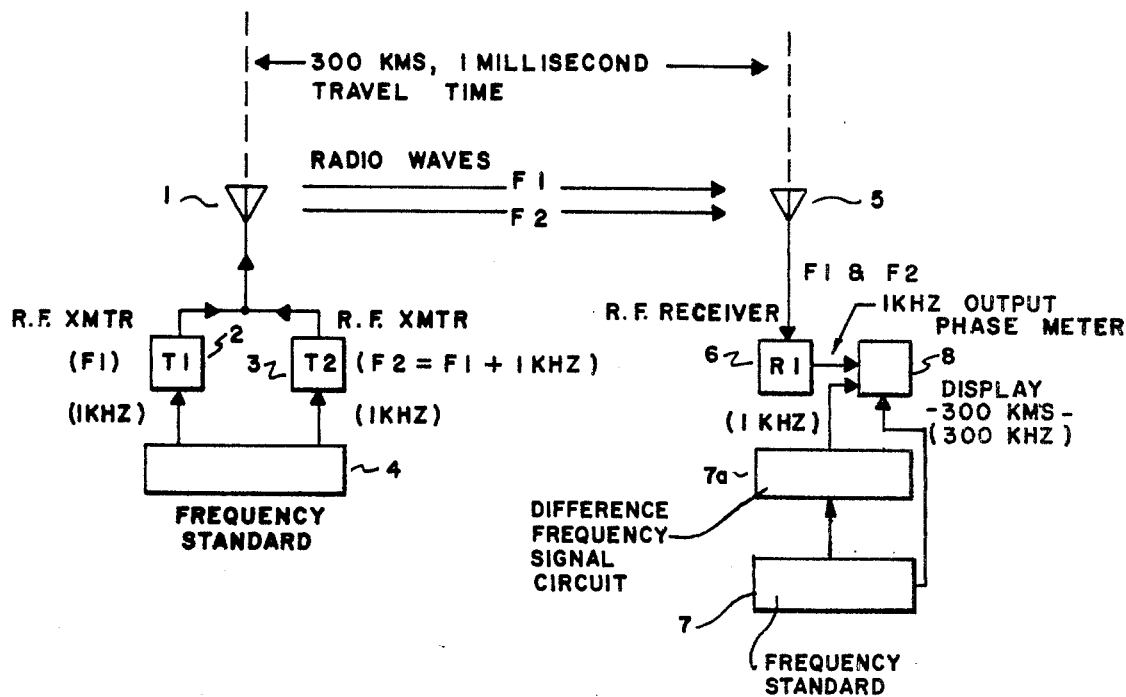

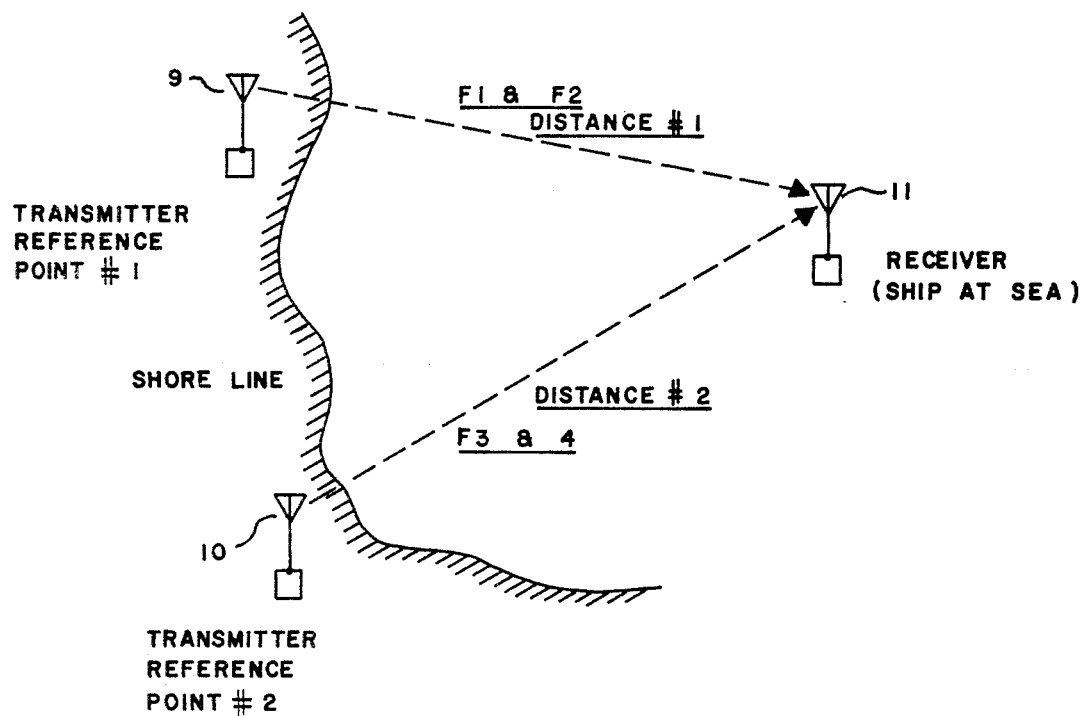

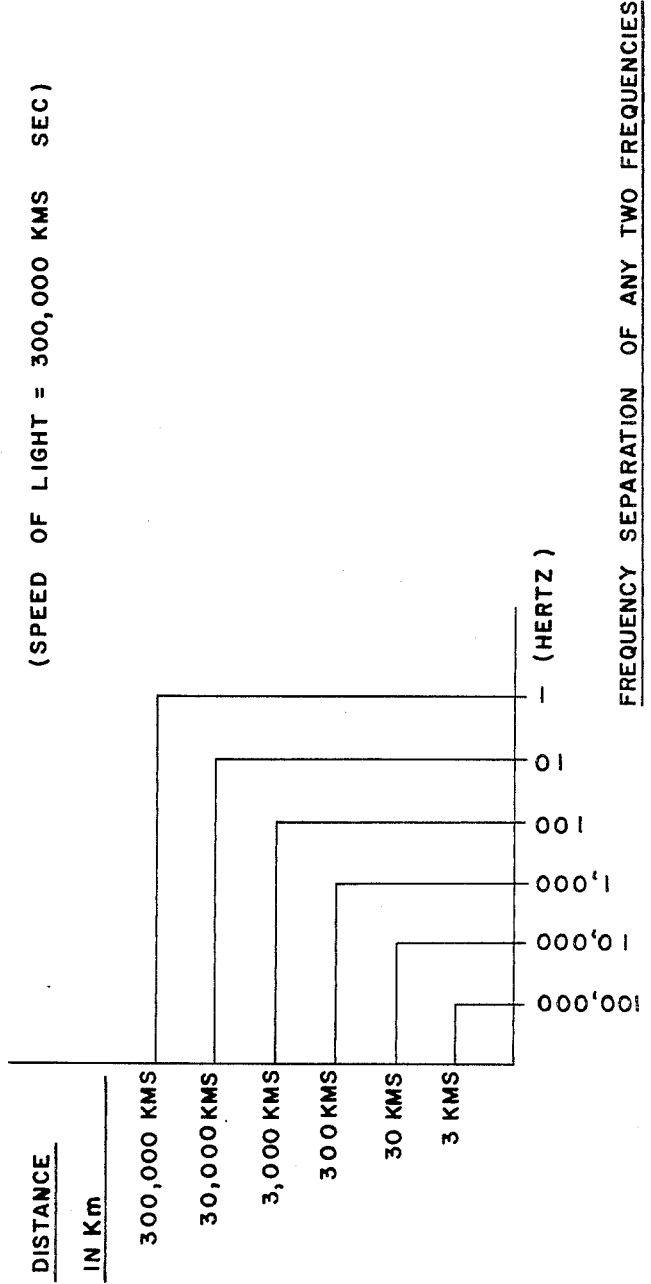
FIGURE NO. 3
RELATION OF MAXIMUM DISTANCE MEASURING (NON AMBIGUOUS) TO FREQUENCY SEPARATION OF 2 FREQUENCIES
(SPEED OF LIGHT = 300,000 KMS SEC)

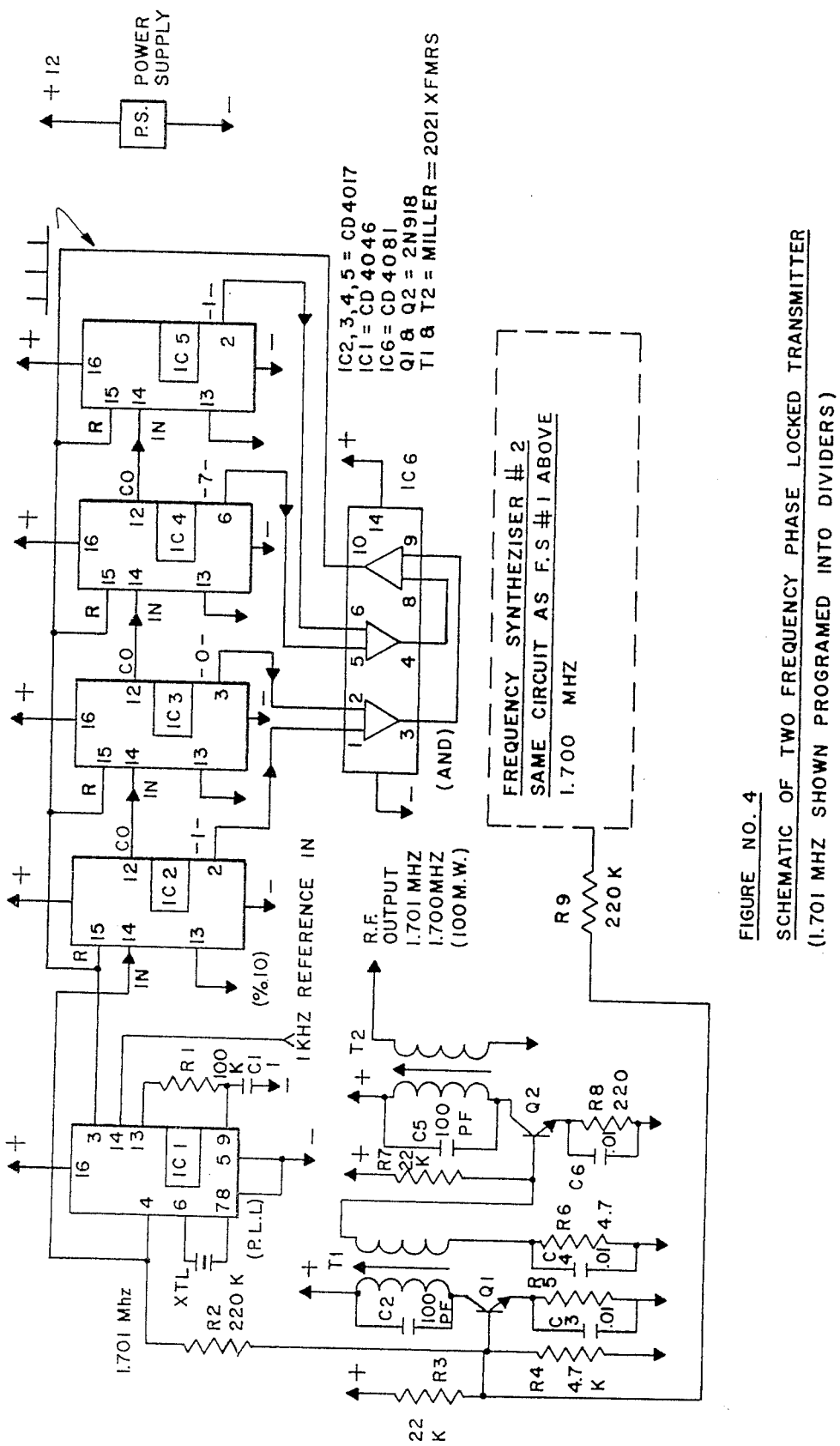
FIGURE NO. 4
SCHEMATIC OF TWO FREQUENCY PHASE LOCKED TRANSMITTER
(1.701 MHZ SHOWN PROGRAMED INTO DIVIDERS)

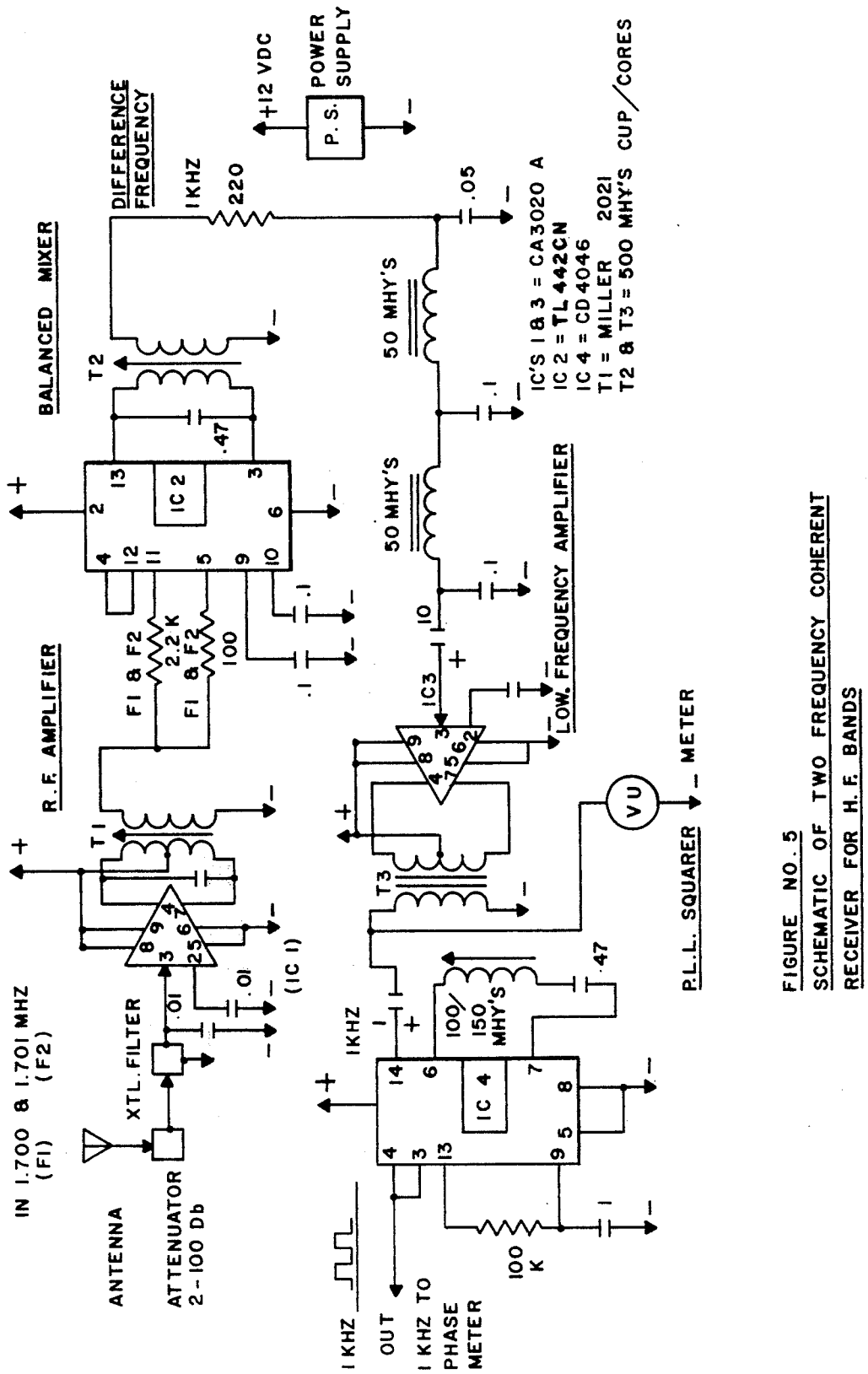

DUAL FREQUENCY DISTANCE MEASURING SYSTEM

BACKGROUND OF THE INVENTION

1. Field of the Invention

The present invention relates generally to radio frequency distance measuring systems and methods, and more particularly to a method and technique for accurately locating the distance or position of an unknown point with respect to known point(s).

It relates to systems and methods using known reference point trnsmitters at known locations, also known as marker beacon systems, to determine the position of an unknown receiving point.

The present invention is of general utility in geodetic surveys, off shore navigation and exploration, air navigation, satellite positioning, vehicle location and general surveying work as used in the construction of highways, harbors and other civil engineering works.

2. Description of the Prior Art

Many phase or time comparison systems have been developed, and are in use, for distance measuring or positioning by radio means.

Among the so called Range/Range positioning systems, where two distances or ranges are measured from an unknown station to known reference stations (by measuring the velocity of light or radio propagation) are the systems disclosed in the following references:

U.S. Pat. No. 3,325,811 to Earp
U.S. Pat. No. 3,397,400 to Maass et al
U.S. Pat. No. 3,613,095 to Elwood
U.S. Pat. No. 3,816,832 to Elwood
U.S. Pat. No. 3,916,410 to Elwood.

Also, the well known OMEGA navigation system, in world wide use, is a conventional system.

In all phase or time measurement systems, stable frequency standards are used. The accuracy of measurements is directly related to the short and long term stability of the frequency standard sources. Two or more sources are brought together, either physically at the same point or to a known distance calibration point, and are calibrated together so that they are at the same frequency and phase. After these sources are separated, the accuracy of the system depends on the long term drift of the two or more sources. All radiated frequencies at the reference point are derived from the reference point source.

Some systems transmit one frequency only, (the OMEGA system), or some transmit a carrier and modulating frequencies (side bands). Conventional single frequency systems suffer from the disadvantage that the maximum distance that can be measured without ambiguity (without having measurements repeat in error) is one wave length. In the OMEGA system to obtain large unambiguous distance measurements, the operating frequency is low, typically 10 to 12 Kilohertz.

To be able to utilize any arbitrary, selected, distance measuring frequency without the need to radiate a cumbersome or awkward low frequency, systems were invented where a radio frequency carrier is pulsed, interrupted, or modulated at a given rate where the rate corresponds to a time period frequency used in the distance measurement. The carrier is only a carrier for the second time period information signal, though in the Elwood system the carrier may also be used to perform a phase measurement for one wave length and a small distance, with a greater distance marker available from the modulation, pulsing or bursting of the carrier.

All carrier modulation, interruption, pulsing or burst schemes suffer from the disadvantage that a second timing signal must be obtained, phase coherent with the reference frequency for generating the carrier, and used to modulate the carrier. Any form of modulation used, FM, AM, single sideband AM, double sideband suppressed carrier, interruption of the carrier or bursting of the carrier (100% AM) suffer from two major inconveniences. First, the modulator can introduce modulation errors in linearity, jitter, noise and phase shifting of the carrier due to the modulation circuits. Second, the modulation process itself of necessity generates side bands, thereby occupying more frequency space than needed, and requiring wide band receivers for reception.

The new and novel two continuous wave carrier signal system and method of the present invention is superior to those conventional systems described above, because while retaining the simplicity of a pure continuous wave radiation system, it allows the flexibility of a modulation system in radiating a second reference time signal without the use of modulation. The second time reference signal in the present invention is the difference in frequency between the two continuous wave carrier signals radiated from the same known point. More than two continuous wave carrier signals can be radiated from each reference or known point, and the present invention as described is not necessarily limited to two continuous wave carrier signals from each known point. The expression "two frequency system" will continue to be used throughout this document for simplicity.

OBJECTS OF THE INVENTION

It is an object of the present invention to provide a system and method of radio frequency distance measurement, based on radiating from a known reference point two or more continuous wave carrier signals separated in frequency from each other by an exact difference frequency. The two or more radio frequency continuous wave carrier signals being derived from a stable frequency source (synthezised), and the frequency separation between pairs of continuous wave carrier signals being exact difference frequencies selected to correspond to a given distance (maximum distance) to be measured without ambiguity.

It is another object of the present invention to provide a system and method by which the difference frequency signal between the two continuous wave carrier signals radiated from the known reference point can be received or detected in a simple receiver.

It is a further object of the present invention to supply the received difference frequency signal to an accurate phase meter or time interval meter, and with the aid of a stable clock frequency generator, derived from a stable frequency source, to display as a distance in meters, or any other arbitrary measuring standard, kilometers, feet, miles, etc., the phase difference between the output of the stable clock frequency generator and the received difference frequency signal.

It is a further object of the present invention to provide a system and method by which pairs of continuous wave carrier signals from two or more known reference point radiating stations can be received and displayed as two or more distances, therefore to provide a position indication of the unknown receiving point.

It is another object of the present invention to provide a distance measuring system that can be used in navigation, positioning surveying, and locating vehicles by radio frequency means.

SUMMARY OF THE INVENTION

The present invention is characterized by one or more transmitting stations of known position. Each transmitting station radiates two continuous wave carrier signals. The separation in frequency between each pair of continuous wave carrier signals being an exact quantity selected to correspond to a difference signal frequency. Each pair of continuous wave carrier signal is used in distance measurements. A coherent derived from a stable frequency standard receiver means at the unknown point receives the radiated pair of continuous wave carrier signals to derive a difference frequency signal therefrom, and compares the derived difference frequency signal with a locally generated difference frequency signal of the same frequency as the difference frequency signal. The phase difference between the locally generated difference frequency signal and the derived difference frequency signal is determined by a phase meter or time interval meter and is subsequently displayed as a measured distance. Two or more of such distance measurements yielding a position in space in reference to the known transmitting stations can be achieved by the apparatus and method of the present invention.

BRIEF DESCRIPTION OF THE DRAWINGS

FIG. 1 is a general block diagram of the two continuous wave carrier signal distance measurement system and method of the present invention.

FIG. 2 shows in pictoral form how distance measurements from two known reference points can be determined in accordance with the present invention to locate an unknown point in space.

FIG 3 is a chart showing the relationship between the difference frequency defined by the separation of the two continuous wave carrier signals and the maximum distance that can be measured without ambiguity in accordance with the present invention.

FIG. 4 is a schematic diagram of a simple, two frequency phase locked transmitter/exciter, suitable for use in the high frequency bands, that works well in the present invention.

FIG. 5 is a schematic diagram of a simple coherent receiver, using no local oscillator, for use in the high frequency bands, that was designed specifically for use in the present invention.

DETAILED DESCRIPTION OF THE PREFERRED EMBODIMENT

A distance measuring system using two frequency continuous wave carrier signals displaced precisely in frequency in accordance with the present invention are radiated from a known source as shown in the block diagram from in FIG. 1. The values for distances, and frequency separation of the two continuous wave carrier signals are given as an aid in understanding the structure and operation of the present invention and should not be construed as limiting factors. Any frequency separation, as shown in FIG. 3, may be used, and other distances than those shown may be measured.

A radio frequency antennna, 1 transmits or radiates the two continuous wave carrier signals, which are derived from transmitters or exciters 2 and 3, respectively. The transmitters 2 and 3 are phase and frequency locked to a frequency standard 4 of high stability, such as a MASER or molecular resonance frequency standard (Hydrogen, Ammonia, Rhubidium, etc.)

The two coherent continuous wave carrier signals F1 and F2, are then radiated by antenna 1 through space at the speed of light, 300,000 Km per second. In the example given in FIG. 1, signals have travelled 300 Km after 1 millisecond. Both signals, F1 and F2 arrive therefore 1 millisecond later at antenna 5, a receiving antenna at an unknown point 300 Km apart from the know shore station. Antenna 5 feeds these signals to a coherent, phase stable receiver 6, that derives or detects the frequency separation between signals F1 and F2, in this case 1 KHz. The 1 KHz difference frequency signals phase or time interval is then applied to a measuring meter where its phase is compared (or the arrival time is measured) against a similar 1 KHz local reference frequency signal from a difference frequency signal circuit 7a derived from a local frequency standard 7 at the receiver location. The phase or time difference between the received difference frequency signal and the locally generated reference signal is a function of the distance between the known reference point and the unknown measuring receive point. This phase or time difference may then be displayed in any convenient unit of distance measurement, such as meters or kilometers. In the example shown in FIG. 1, a 300 KHz clock frequency from circuit 7a, derived from frequency standard 7, is used as a display base to yield a reading in Km (Kilometers) from the phase meter 8. As in other measurement systems, the two frequency standards, that is the one at the known reference point transmitting station and the one at the unknown point receiving station, must be periodically calibrated, either by bringing them together, or by bringing the receiving station to a known distance point from the transmitting station and adjusting both standards so that they are in exact frequency and phase. In FIG. 2, the dual continuous wave carrier signal distance measuring system and method of the present invention is shown as a position locator or indicator by using two or more known reference point transmitting stations as coordinates. Transmitting stations 9 and 10 each send a pair of continuous wave carrier signals to a distant receiving station 11, which in the example shown in FIG. 2 is a ship at sea. Different frequencies are used by the different shore stations. In the example of FIG. 2, F1 and F2 are used by station 9, and F3 and F4 are used by station 10.

Knowing the two distances involved from the two transmitting stations 99,10, and knowing the exact location of these transmitting stations, the receiver station 11 can determine its exact position by triangulation techniques, using accurate charts.

As mentioned before with respect to FIG. 3, any frequency separation between the two continuous wave carrier signals of the present invention can be used. There are however convenient frequency separations that yield optimum results, and can be selected to fit the range requirements of a given system. Because the difference frequency component is used as a reference time marker to be compared to a locally generated time marker, an ambiguity can occur if this unit of time overlaps a given distance. For example if a 1 KHz separation between the signal pair F1 to F2 is used, yielding a 1 KHz received frequency signal difference and therefore a 1 millisecond time base, an ambiguity will occur after 300 kilometers. This is due to the fact that a signal arriving at an unknown position of 301 kilometers will be displayed as position of 1 kilometer because the two, one millisecond time markers have overlapped.

To avoid this phenomena, the frequency separation between the pair of signals can be selected with the aid of FIG. 3 in such a manner that a maximum non-ambiguous range can be obtained. As an example, a frequency separation of 1 Hz between a signal pair yields a 1 Hz. time marker, and, with light speed being 300,000 Kms per second, a maximum non ambiguous range of 300,000 Kilometers. To interpret FIG. 3, read frequency separation on one side, follow the solid line to the other side, and read distance in Kilometers or maximum non ambiguous range in Kilometers on the vertical axis.

For an optimum system in accordance with the present invention, the range selected (and therefore frequency separation between signals F1 and F2) should be large enough to permit measurements within this range, but not so large that the accuracy or resolution of the system is impaired. For example, a world wide navigation system may need a frequency separation of 10 Hertz, equivalent to a 30,000 Kilometer non ambiguous range, while a surveying, local small distance measuring system such as used by Civil Engineers in road construction could best utilize a frequency separation of 100,000 Hz for a non-ambiguous range of 3 Kilometers.

FIG. 4 shows a schematic of a dual continuous wave carrier signal transmitter or exciter that has operated well in the method and apparatus of the present invention. It is a phase coherent, two signal exciter employing two frequency synthezisers, a linear mixer, and amplifier stages. IC1 is a VXCO, that is to say, a voltage controlled crystal controlled oscillator employing one CD4046 integrated circuit. A crystal controlled oscillator, where the crystal is a few Hz (typically 50) higher than the desired frequency, and a voltage controlled phase lock circuit yield the best stability, both long and short term, and a lower jitter or phase noise, as compared to free running R/C or L/C (resistance inductance and capacitance) voltage controlled oscillators. The output of the VXCO is fed to a divide by N" divider chain made up of Ic's 2, 3, 4 and 5, which are all CD4017 decimal dividers.

The carry out (CO) output of each divider, is fed to the input of the next divider of the divider chain. By looking for a given number to appear in all four decimal counters, the counter may be reset in any desired 1 KHz multiple frequency. For example, as shown in FIG. 4, the counter is pre-set to 1.701 MHz, by picking up 1 in the MHz counter, 7 in the hundreds of KHz counter, zero in the tens of KHz counter and 1 in the units KHz counter. All of these count outputs are fed to a four input AND gate IC6 formed by a CD4081 circuit. When the counters reach the desired number, all four gate inputs go high, and a short "high" pulse appears at Pin 10 of the CD 4081. This pulse is applied as a reset pulse to all decimal counters to bring them back to a starting count of 0. Because these short reset pulses occur at a 1,000 times per second rate, the pulses are also fed to the phase comparator section of the CD4046 pin 3, where they are compared with 1 KHz pulses or square waves generated by a stable frequency standard. The output of the CD4046 is a square wave, phase and frequency locked to a 1 Hhz multiple of the frequency standard (other multiples may be used by changing the number of counters, the divide ratio and the reference).

The outputs of the two syntheziser are mixed in a linear mixer formed by transistor Q1 used in a tuned radio frequency amplifier. The square waves from the syntheziser are converted to sine waves by the tuned circuits, T1 and T2 in the exciter, plus added tuned circuits in other radio frequency power amplifier stages, not shown in the drawing, but needed to increase power to any desired level. Transistor Q2 is used in a second radio frequency amplifier. The outputs shown are 1.701 and 1.700 MHz. A linear amplifier should be used to increase power levels and keep intermodulation distortion at a minimum.

A simple coherent receiver, as shown in the schematic of FIG. 5, can be employed in the present invention. An H.F. receiver is shown, but the same technique could be used for other bands using different components. The receiver consists of an attenuator, being fed by a suitable antenna, which attenuator in turn feeds a crystal filter (or other type filters at higher frequencies). The crystal filter feeds a CA3020 H.F. amplifier, that amplifies the incoming 1.700 and 1.701 MHz signals by approximately 56 db. The CA3020 is a linear amplifier. Any other linear amplifier of suitable characteristics may be used. The output of the RF amplifier is split in two, by a 2.2 K and 100 ohm resistor divider, and is fed to a TL442CN (Texas Instruments) balanced mixer. The 1.700 and 1.701 MHz components beat against each other in the balanced mixer, to produce the received 1 KHz difference frequency signal.

This 1 Khz difference frequency signal is passed through an added low pass filter, formed by two 50 MHz coils and capacitors, and then fed to a second CA3020 (RCA) linear amplifier IC3 acting as a low frequency amplifier.

A VU meter is used to display the level of the received 1 KHz (or other frequencies) difference frequency signal component. The attenuator (RF input attenuator) is used to keep this VU meter reading at a constant peak voltage, regardless of the distance between measuring points, and within the sensitivity range of the receiver. This is done to prevent changes in received signal level from causing a phase change in the receiver, and therefore introducing an error.

Although the sine wave output of the receiver could be used as a direct feed to a good phase or time interval meter, it is preferable to square this sine wave for more accurate measurements. A second CD4046 Phase Locked Loop VCO circuit IC4 is used as a squarer. Using this circuit avoids zero axis crossing distortion errors, present in most sine wave to square wave converters using abrupt level switches or comparators. The tuned circuit between pins 6 and 7, formed by a tunable coil and a fixed capacitor, is tuned to a point slightly above 1 KHz, in the receiver shown, or some other frequency reference if other than 1 KHz is used as frequency separation between the pair of continuous wave carrier signals.

The output at pin 4 of the CD4046 is a square wave, phase locked to the difference frequency signal of the receiver. The exact circuits of a phase meter, or time interval meter are not shown, because they are conventional.

While only certain preferred embodiments are shown and described herein, it is understood that many modifications are possible, particularly in circuit design of transmitter and receivers, and that the present invention is not limited to the specific circuits and examples disclosed, nor otherwise, except as set forth in the following claims,

What is claimed is:

1. A transmitting station in a radio frequency distance measuring system utilized to determine the distance of a unknown point from a known point, which comprises:
    (a) stable frequency source means for providing a first signal of a given frequency and a given phase;
    (b) means responsive to said first signal for generating a first continuous wave carrier signal of a first frequency;
    (c) means responsive to said first signal for generating a second continuous wave carrier signal of a second frequency, said second frequency displaced from said first frequency by a selected difference frequency; and
    (d) means for radiating said first and second continuous wave carrier signals for reception at said unknown point for providing a difference frequency signal for determining said distance.

2. The transmitting station as recited in claim 1, wherein said stable frequency source means comprises an atomic clock.

3. The transmitting station as recited in claim 1, said stable frequency source means comprises a molecular resonance frequency standard.

4. The transmitting station as recited in claim 1, wherein said first continuous wave carrier signal generating means includes frequency synthesizer means controlled by said first signal for synthesizing said first continuous wave carrier signal of said first frequency.

5. The transmitting station as recited in claim 4, wherein said second continuous wave carrier signal generating means includes frequency synthesizer means controlled by said first signal for synthesizing said second continuous wave carrier signal of said second frequency.

6. The transmitting station as recited in claim 1, wherein said means for radiating comprises:
    (a) means for combining said first and second continuous wave carrier signals; and
    (b) antenna means for radiating said combined first and second continuous wave carrier signals.

7. The transmitting station as recited in claim 6, further comprising means for amplifying linearly said combined first and second continuous wave carrier signals and for providing said amplified, combined first and second continuous wave carrier signals to said antenna means.

8. The transmitting station as recited in claim 1, wherein said first continuous wave carrier signal generating means includes frequency synthesizer means controlled by said first signal for synthesizing said first continuous wave carrier signal of said first frequency, said first continuous wave carrier signal having a square waveform, and
    wherein said second continuous wave carrier signal generating means includes frequency synthesizer means controlled by said first signal for synthesizing said second continuous wave carrier signal of said second frequency, said second continuous wave carrier signal having a square waveform.

9. The transmitting station as recited in claim 8, wherein said means for radiating comprises:
    (a) means for combining said first and second continuous wave carrier signals;
    (b) low pass filter means responsive to the combined first and second continuous wave carrier signals for passing only the fundamental sinusoidal frequency components of said combined first and second continuous wave carrier signals; and
    (c) antenna means for radiating said fundamental sinusoidal frequency components of said combined first and second continuous wave carrier signals.

10. The transmitting station as recited in claim 9, further comprising means for amplifying linearly said fundamental sinusoidal frequency components of said combined first and second continuous wave carrier signals and for providing said amplified, fundamental sinusoidal frequency components of said combined first and second continuous wave carrier signals to said antenna means.

11. The transmitting station as recited in claim 9, wherein said means for combining comprises at least one active device.

12. A radio frequency distance measuring system for determining the distance of an unknown point from a known point, which comprises:
    (a) means for providing a first signal of a given frequency and a given phase;
    (b) means responsive to said first signal for generating a first continuous wave carrier signal of a first frequency;
    (c) means responsive to said first signal for generating a second continuous wave carrier signal of a second frequency, said second frequency displaced from said first frequency by a selected difference frequency;
    (d) means for radiating said first and second continuous wave carrier signals; and
    (e) means for receiving said first and second continuous wave carrier signals at said unknown point to provide a difference frequency signal used in determining said distance.

13. The radio frequency distance measuring system as recited in claim 12, wherein said means for providing a first signal comprises an atomic clock.

14. The radio frequency distance measuring system as recited in claim 12, wherein said means for providing a first signal comprises a molecular resonance frequency standard.

15. The radio frequency distance measuring system as recited in claim 12, wherein said first continuous wave carrier signal generating means includes frequency synthesizer means controlled by said first signal for synthesizing said first continuous wave carrier signal of said first frequency.

16. The radio frequency distance measuring system as recited in claim 12, wherein said second continuous wave carrier signal generating means includes frequency synthesizer means controlled by said first signal for synthesizing said second continuous wave carrier signal of said second frequency.

17. The radio frequency distance measuring system as recited in claim 12, wherein said means for radiating comprises:
    (a) means for combining said first and second continuous wave carrier signals; and
    (b) antenna means for radiating said combined first and second continuous wave carrier signals.

18. The radio frequency distance measuring system as recited in claim 17, further comprising means for amplifying linearly said combined first and second continuous wave carrier signals and for providing said amplified, combined first and second continuous wave carrier signals to said antenna means.

19. The radio frequency distance measuring system as recited in claim 12, wherein said first continuous wave carrier signal generating means includes frequency synthesizer means controlled by said first signal for synthesizing said first continuous wave carrier signal of said first frequency, said first continuous wave carrier signal having a square waveform, and wherein said second continuous wave carrier signal generating means includes frequency synthesizer means controlled by said first signal for synthesizing said second continuous wave carrier signal of said second frequency, said second continuous wave carrier signal having a square waveform.

20. The radio frequency distance measuring system as recited in claim 19, wherein means for radiating comprises:
   (a) means for combining said first and second continuous wave carrier signals;
   (b) low pass filter means responsive to the combined first and second continuous wave carrier signals for passing only the fundamental sinusoidal frequency component of said combined first and second continuous wave carrier signals; and
   (c) antenna means for radiating said fundamental sinusoidal frequency component of said combined first and second continuous wave carrier signals.

21. The radio frequency distance measuring system as recited in claim 20, wherein said means for combining comprises at least one active device.

22. The radio frequency distance measuring system as recited in claim 19, further comprising means for amplifying linearly said fundamental sinusoidal frequency components of said combined first and second continuous wave carrier signals and for providing said amplified, fundamental sinusoidal frequency components of said combined first and second continuous wave carrier signals to said antenna means.

23. The radio frequency distance measuring system as recited in claim 12, wherein said means for receiving comprises:
   (a) means for generating a second signal of said given frequency and of a predetermined phase relationship with respect to said given phase;
   (b) means for mixing said received first and second continuous wave carrier signals to produce said difference frequency signal;
   (c) means responsive to said second signal for supplying a third signal having said phase of said second signal and said frequency of said difference frequency signal; and
   (d) means for comparing the phase difference between said difference frequency signal and said third signal.

24. The radio frequency distance measuring system as recited in claim 23, further comprising means responsive to said phase difference between said difference frequency signal and said third signal for indicating the distance between said known point and said unknown point.

25. The radio frequency distance measuring system as recited in claim 23, wherein said means for receiving further comprises:
   (a) antenna means for providing said received first and second continuous wave carrier signals; and
   (b) means for amplifying said received first and second continuous wave carrier signals to furnish said amplified, received first and second continuous wave carrier signals to said means for mixing.

26. The radio frequency distance measuring system as recited in claim 23, wherein said means for receiving further comprises phase locked loop means for bandpass filtering said difference frequency signal to provide said bandpass filtered difference frequency signal to said means for comparing.

27. The radio frequency distance measuring system as recited in claim 23, wherein said means for generating a second signal comprises an atomic clock.

28. The radio frequency distance measuring system as recited in claim 23, wherein said means for generating a second signal comprises a molecular resonance frequency standard.

29. The radio frequency distance measuring system as recited in claim 23, wherein said means for mixing comprises a balanced mixer.

30. A radio frequency position measuring system for calculating the position of an unknown point from at least two known points, which comprises:
   (a) means for producing a first signal of a given frequency and a given phase;
   (b) means responsive to said first signal for generating a first continuous wave carrier signal of a first frequency;
   (c) means responsive to said first signal for generating a second continuous wave carrier signal of a second frequency, said second frequency displaced from said first frequency by a first selected difference frequency;
   (d) means at said first known point for radiating said first and second continuous wave carrier signals;
   (e) means for producing a second signal of said given frequency and of a predetermined phase relationship with respect to said given phase;
   (f) means responsive to said second signal for generating a third continuous wave carrier signal of a third frequency;
   (g) means responsive to said second signal for generating a fourth continuous wave carrier signal of a fourth frequency displaced from said third frequency by a second selected difference frequency;
   (h) means at said second known point for radiating said third and fourth continuous wave signals;
   (i) means at said unknown point for receiving said first and second continuous wave carrier signals to provide a first difference frequency signal and for receiving said third and fourth continuous wave carrier signals to provide a second difference frequency signal, said first and second difference frequency signals used in determining the position of said unknown point with respect to said first and second known points.

31. A radio frequency distance measuring system, which comprises:
   (a) transmitter means located at a known point, which includes
      (i) means for generating a first standard signal of a selected frequency and selected phase,
      (ii) means responsive to said first standard signal for producing a first continuous wave carrier signal of a first frequency,
      (iii) means responsive to said first standard signal for producing a second continuous wave carrier signal of a second frequency, said second frequency displaced from said first frequency by a selected difference frequency, and
      (iv) means for radiating said first and second continuous wave carrier signals; and (b) means located at an unknown point, which includes
  (i) means for generating a second standard signal of said selected frequency and of a predetermined phase relationship with respect to said selected phase,
  (ii) means for receiving said first continuous wave carrier signal and said second continuous wave carrier signal,
  (iii) means for mixing said receiving first and second continuous wave carrier signals to obtain a frequency difference signal,
  (iv) means for providing a reference signal in accordance with said second standard signal, and
  (v) means for determining the distance between said known point and said unknown point by comparing the phase difference between said reference signal and said frequency difference signal.

32. The radio frequency distance measuring system as recited in claim 31, wherein said means for generating said first standard signal comprises a molecular resonance frequency standard,
  wherein said means for producing a first continuous wave carrier signal comprises a frequency synthesizer,
  wherein said means for producing a second continuous wave carrier signal comprises a frequency synthesizer, and
  wherein said means for mixing comprises a balanced mixer.

33. The radio frequency distance measuring system as recited in claim 31, wherein said means for providing a reference signal comprises means for providing said reference signal at substantially the frequency of said frequency difference signal and at substantially the phase of said second standard signal.

34. A radio frequency distance measuring method for determining the distance between an unknown point and a known point, which comprises the steps of:
  (a) producing a first signal of a given frequency and a given phase;
  (b) generating in response to said first signal a first continuous wave carrier signal of a first frequency;
  (c) generating in response to said first signal a second continuous wave carrier signal of a second frequency, said second frequency displaced from said first frequency by a selected difference frequency; and
  (d) radiating said first and second continuous wave carrier signals for reception at said unknown point to provide a difference frequency signal used in determining said distance.

35. The radio frequency distance measuring method as recited in claim 34, wherein the step of generating a first continuous wave carrier signal comprises the step of frequency synthesizing said first continuous wave carrier signal in accordance with said first signal, and
  wherein the step of generating a second continuous wave carrier signal comprises the step of frequency synthesizing said second continuous wave carrier signal in accordance with said first signal.

36. The radio frequency distance measuring method as recited in claim 34, wherein the step of producing a first signal comprises the step of generating said first signal using a molecular resonance frequency standard.

37. The radio frequency distance measuring method as recited in claim 34, wherein the step of radiating said first and second continuous wave carrier signals comprises the steps of:
  (a) combining said first and second continuous wave carrier signals; and
  (b) employing an antenna means to radiate said combined first and second continuous wave carrier signals.

38. The radio frequency distance measuring method as recited in claim 34, wherein the step of generating a first continuous wave carrier signal comprises the step of generating a square wave signal of said first frequency, and
  wherein the step of generating a second continuous wave carrier signal comprises the step of generating a square wave signal of said second frequency.

39. The radio frequency distance measuring method as recited in claim 38, wherein the step of radiating said first and second continuous wave carrier signals comprises the steps of:
  (a) combining said first and second continuous wave carrier signals;
  (b) filtering said combined first and second continuous wave carrier signals for extracting the fundamental sinusoidal frequency components of said combined first and second continuous wave carrier signals; and
  (c) furnishing said filtered, combined first and second continuous wave carrier signals to antenna means for radiating said signals.

40. The radio frequency distance measuring method as recited in claim 39 further including the steps of:
  (a) amplifying linearly said filtered, combined first and second continuous wave carrier signals; and
  (b) providing said amplified, filtered and combined first and second continuous wave carrier signals to said antenna means.

41. A radio frequency distance measuring method for determining the distance of an unknown point from a known point, which method comprises the steps of:
  (a) generating a first signal of a given frequency and of a given phase;
  (b) generating as a function of said first signal a first continuous wave carrier signal of a first frequency;
  (c) generating as a function of said first signal a second continuous wave carrier signal of a second frequency, said second frequency displaced from said first frequency by a selected difference frequency;
  (d) radiating from said known point said first and second continuous wave carrier signals;
  (e) receiving at said unknown point said first and second continuous wave carrier signals;
  (f) mixing said received first and second continuous wave carrier signals for producing a difference frequency signal used in determining said distance.

42. The radio frequency distance measuring method as recited in claim 41, further comprising the steps of:
  (a) generating a second signal of said given frequency and of a predetermined phase relationship with respect to said given phase; and
  (b) providing a reference signal having the phase of said second signal and the frequency of said difference frequency signal.

43. The radio frequency distance measuring method as recited in claim 42, wherein said step of mixing said received first and second continuous wave carrier signals comprises the step of balance mixing said first and second continuous wave carrier signals for producing said difference frequency signal.

44. The radio frequency distance measuring method as recited in claim 43, further comprising the step of determining said distance in accordance with the phase difference between said reference signal and said difference frequency signal.

* * * * *

UNITED STATES PATENT AND TRADEMARK OFFICE
CERTIFICATE OF CORRECTION

PATENT NO. : 4,283,726

DATED : August 11, 1981

INVENTOR(S) : Lewis C. Spence and Stephen Martin

It is certified that error appears in the above—identified patent and that said Letters Patent is hereby corrected as shown below:

Column 1, line 13, change "trnsmitters" to --transmitters--.

Column 2, line 31, delete "The expression 'two frequency system'";

line 32, delete in its entirety;

line 33, delete in its entirety;

Column 3, line 12, delete "signal";

line 13, after "frequency" insert --signal used in distance measurements--, and change "signal" to --signals--.

line 14, delete "used in distance measurements" and insert therefor --derived from a stable frequency standard--, and after "coherent" delete "derived"; and

UNITED STATES PATENT AND TRADEMARK OFFICE
CERTIFICATE OF CORRECTION

PATENT NO. : 4,283,726

DATED : August 11, 1981

INVENTOR(S) : Lewis C. Spence and Stephen Martin

It is certified that error appears in the above—identified patent and that said Letters Patent is hereby corrected as shown below:

line 15, delete "from a stable frequency standard".

Column 4, line 11, change "know" to --known--; and
line 16, delete "phase or time interval", and after "applied to a" insert --phase or time interval--.

Column 5, line 66, change "Hhz" to --KHz--.

Column 6, line 38, delete "component";

Column 7, line 5, change "a" to --an--.

Signed and Sealed this

Twentieth Day of July 1982

[SEAL]

Attest:

*Attesting Officer*

GERALD J. MOSSINGHOFF

*Commissioner of Patents and Trademarks*